United States Patent
DiCarlo

(10) Patent No.: US 9,249,923 B2
(45) Date of Patent: Feb. 2, 2016

(54) OPTICAL DEVICE MOUNTING APPARATUS AND RELATED METHODS THEREOF

(71) Applicant: American Creative Machine Enterprise, LLC, Manchester, NH (US)

(72) Inventor: Joseph DiCarlo, Chester, NH (US)

(73) Assignee: Robert J. McCreight, Jr., San Antonio, TX (US)

( * ) Notice: Subject to any disclaimer, the term of this patent is extended or adjusted under 35 U.S.C. 154(b) by 119 days.

(21) Appl. No.: 13/896,640

(22) Filed: May 17, 2013

(65) Prior Publication Data

US 2014/0239146 A1   Aug. 28, 2014

Related U.S. Application Data

(60) Provisional application No. 61/768,002, filed on Feb. 22, 2013.

(51) Int. Cl.
| | |
|---|---|
| *F16M 11/00* | (2006.01) |
| *F16M 13/02* | (2006.01) |
| *F16M 11/04* | (2006.01) |
| *F16M 13/00* | (2006.01) |

(52) U.S. Cl.
CPC .............. *F16M 13/02* (2013.01); *F16M 11/041* (2013.01); *F16M 13/00* (2013.01); *Y10T 29/49826* (2015.01)

(58) Field of Classification Search
USPC ........ 248/316.1, 316.2, 231.31, 230.2, 228.2, 248/229.21, 222.13, 187.1, 177.1, 176.1
See application file for complete search history.

(56) References Cited

U.S. PATENT DOCUMENTS

| | | | | |
|---|---|---|---|---|
| 4,899,479 | A | * | 2/1990 | Sanders .......................... 42/112 |
| 5,236,169 | A | * | 8/1993 | Johnsen ........................ 248/561 |
| 5,307,204 | A | | 4/1994 | Dor |
| 5,331,459 | A | | 7/1994 | Dor |
| 5,339,464 | A | | 8/1994 | Dor |
| 5,388,359 | A | * | 2/1995 | DeWitt ...................... 40/607.14 |
| D358,830 | S | | 5/1995 | Dor |
| 5,707,036 | A | * | 1/1998 | Dunbar ....................... 248/447.2 |
| 5,914,816 | A | | 6/1999 | Soto et al. |
| 6,019,329 | A | * | 2/2000 | Edelstein .................... 248/228.3 |
| 6,457,179 | B1 | | 10/2002 | Prendergast |
| 6,472,776 | B1 | | 10/2002 | Soto et al. |
| D483,650 | S | * | 12/2003 | Squillante et al. ............. D8/349 |
| 6,751,810 | B1 | | 6/2004 | Prendergast |
| 6,862,748 | B2 | | 3/2005 | Prendergast |
| 6,938,276 | B1 | | 9/2005 | Prendergast |
| 6,957,449 | B2 | | 10/2005 | Prendergast |
| 6,986,162 | B2 | | 1/2006 | Soto et al. |

(Continued)

Primary Examiner — Steven Marsh
(74) Attorney, Agent, or Firm — Hayes Soloway PC

(57) ABSTRACT

An optical device mounting apparatus and related methods are disclosed. The apparatus includes a base plate with a first fastener positioned through a hole in the base plate, wherein the first fastener is removably engageable with the optical device. A first wall is connected to the base plate and extends in a substantially perpendicular direction from the base plate. A second wall is connected to the base plate and extends in a substantially perpendicular direction from the base plate, wherein the second wall is different from the first wall. A stabilizing fastener is movably engaged within a hole formed within the second wall, wherein a space between the stabilizing fastener and the first wall removably receives a mounting structure of the optical device, wherein the mounting structure of the optical device is contactable by the stabilizing fastener and the first wall when it is received within the space.

20 Claims, 16 Drawing Sheets

(56) References Cited

U.S. PATENT DOCUMENTS

| | | |
|---|---|---|
| 7,418,738 B2 | 9/2008 | Prendergast |
| 7,444,683 B2 | 11/2008 | Prendergast et al. |
| 7,504,918 B2 | 3/2009 | Prendergast et al. |
| 7,649,701 B2 | 1/2010 | Prendergast et al. |
| 7,735,159 B2 | 6/2010 | Prendergast |
| 7,996,917 B2 | 8/2011 | Prendergast |
| 8,011,629 B2 * | 9/2011 | Herskovic ............. 248/230.1 |
| 8,238,045 B2 | 8/2012 | Prendergast et al. |
| 8,239,971 B2 | 8/2012 | Prendergast |
| 8,337,036 B2 | 12/2012 | Soto et al. |

\* cited by examiner

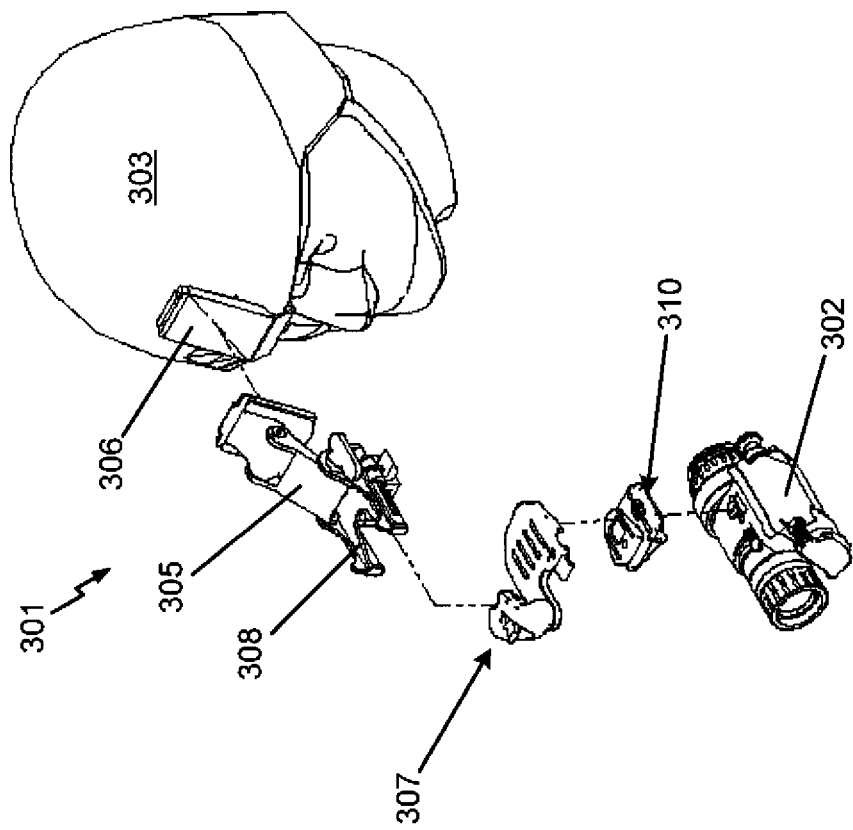

OPTICAL DEVICE MOUNTING APPARATUS AND RELATED METHODS THEREOF

CROSS REFERENCE TO RELATED APPLICATION

This application claims benefit of U.S. Provisional Application Ser. No. 61/768,002, entitled, "Optical Device Mounting Apparatus and Adjustable Mounting Shoe" filed Feb. 22, 2013, the entire disclosure of which is incorporated herein by reference.

FIELD OF THE DISCLOSURE

The present disclosure is generally related to mounting devices and more particularly is related to an optical device mounting apparatus and related methods thereof.

BACKGROUND OF THE DISCLOSURE

Optical devices are commonly used in various environments to enhance the capabilities of the user's vision. In military environments, various optical devices are used to give a soldier enhanced visibility in harsh conditions. For example, devices like the PVS 14 night vision monocular are commonly used in the military to enhance a soldier's visibility in low light conditions. These optical devices are affixed to combat helmets, weapons, or other structures that a soldier uses, and during a field operation, a soldier may move the optical device between the various mounting structures.

The use of a shoe to secure an optical device to a mounting structure, such as a combat helmet or a weapon, is well-known in the art. The shoe may have various designs, depending on the mounting structure the optical device is mounted to, and it is beneficial for the various designs of the shoe to be interchangeable with different mounts. There are two main types of conventional shoes: a shoe for engagement with a butterfly clip commonly used to mount optical devices to weapons; and a shoe with a pocket, commonly used to mount optical devices to a combat helmet. Both types of conventional shoes are static, unitary structures with a dovetail shape and a plurality of angled sidewalls which allow the shoe to engage with a receiver. The shoe for engagement with the butterfly clip utilizes an angled back surface, such as a 10° angle along the edge at the wide end of the dovetail shape, to engage with a butterfly clip when the shoe is inserted into the mounting receiver. The shoe with the pocket is secured within the mounting receiver with a retractable locking mount which moves into the pocket to engage with the shoe.

There are many difficulties that a soldier may experience when attempting to mount, remount, or remove the optical device from the mounting structure. For instance, the mounting devices needed for mounting the optical device to a weapon may be different from those needed to mount the optical device to a helmet. The soldier may be required to carry and use a number of mounting components to ensure universal mounting on the mounting structures, which can add unneeded weight to a soldier's pack and increase remounting time from one mounting structure to another. Additionally, many conventional mounting devices do not allow for quick mounting or quick dismounting of the optical device. When the optical devices are successfully mounted, they may be exposed to rough, forceful conditions which can lead to inadvertent loosing or dismounting of the optical device, or complicate removal of the optical device. For example, discharging a weapon outfitted with an optical device may loosen the mounting structures retaining the optical device to the weapon, which can lead to complications in using the optical device.

Thus, a heretofore unaddressed need exists in the industry to address the aforementioned deficiencies and inadequacies.

SUMMARY OF THE DISCLOSURE

Embodiments of the present disclosure provide an optical device mounting apparatus. Briefly described, in architecture, one embodiment of the apparatus, among others, can be implemented as follows. The optical device mounting apparatus includes a base plate and a first fastener positioned through a hole in the base plate, wherein the first fastener is removably engageable with the optical device. A first wall is connected to the base plate and extends in a substantially perpendicular direction from the base plate. A second wall is connected to the base plate and extends in a substantially perpendicular direction from the base plate, wherein the second wall is different from the first wall. A stabilizing fastener is movably engaged within a hole formed within the second wall, wherein a space between the stabilizing fastener and the first wall removably receives a mounting structure of the optical device, wherein the mounting structure of the optical device is contactable by the stabilizing fastener and the first wall when it is received within the space.

The present disclosure can also be viewed as providing an optical device mount. Briefly described, in architecture, one embodiment of the mount, among others, can be implemented as follows. The optical device mount comprises a base plate. A first threaded fastener is positioned through a counterbored hole in a middle portion of the base plate, wherein a head of the first threaded fastener is positioned below a surface of the base plate. At least a first wall and a second wall are connected to the base plate and extend in a substantially perpendicular direction from the base plate, wherein the first wall is in an opposing position to the second wall. A threaded stabilizing fastener is movably positioned at least partially within a hole formed within the second wall, the threaded stabilizing fastener having a device contact surface positioned between the first and second walls.

The present disclosure can also be viewed as providing methods of mounting an optical device to an optical device mounting structure. In this regard, one embodiment of such a method, among others, can be broadly summarized by the following steps: engaging a first fastener with a receiving hole positioned in a first surface of a mounting structure of the optical device, wherein the first fastener is positioned through a base plate hole within a base plate of the optical device mounting structure; contacting a second surface of the mounting structure of the optical device with a first wall of the base plate, wherein the second surface of the mounting structure is substantially perpendicular to the first surface; and contacting a third surface of the mounting structure of the optical device with a stabilizing fastener connected to the base plate, thereby biasing the mounting structure between the first wall of the base plate and the stabilizing fastener, wherein the third surface is substantially perpendicular to the first surface and substantially parallel to the second surface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 is an exploded illustration of the optical device mounting apparatus in use with a helmet mounting system, in accordance with a fourth exemplary embodiment of the present disclosure.

DETAILED DESCRIPTION

Figure 1:
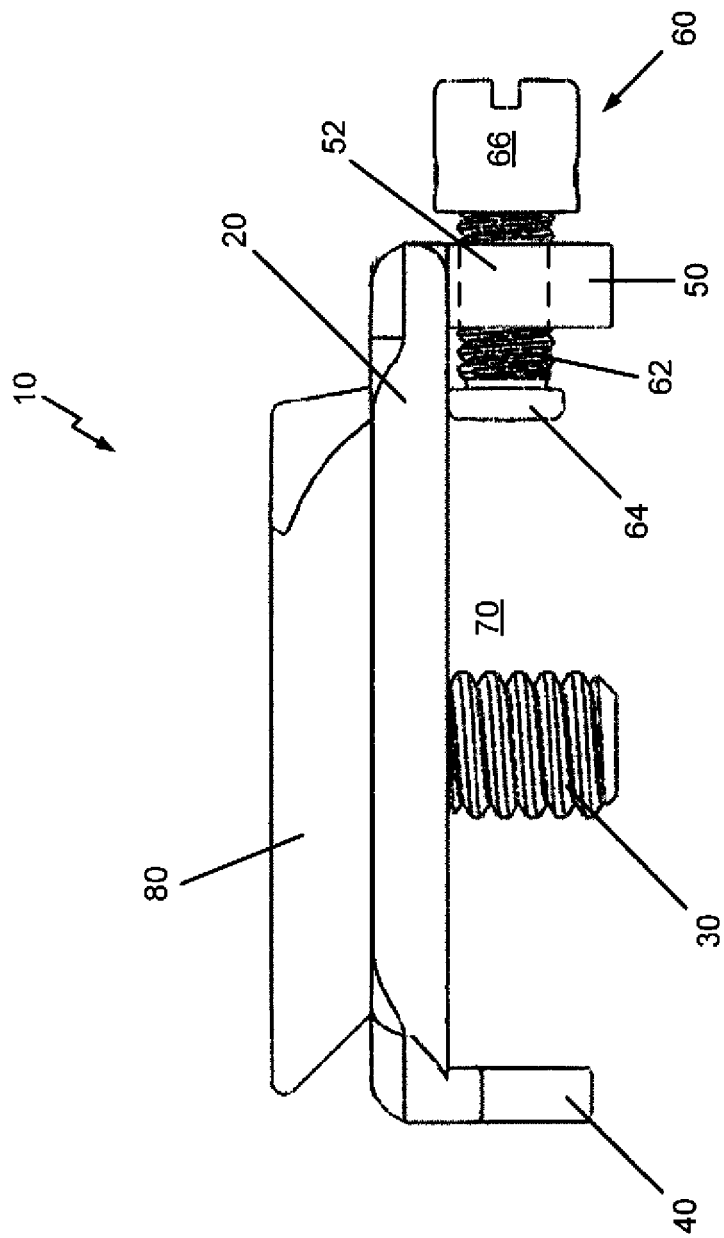
FIG. 1 is a side view illustration of an optical device mounting apparatus, in accordance with a first exemplary embodiment of the present disclosure.

FIG. 1A is a side view illustration of an optical device mounting apparatus 10, in accordance with a first exemplary embodiment of the present disclosure. The optical device mounting apparatus 10, which may be referred to herein as 'apparatus 10' includes a base plate 20. A first fastener 30 is positioned through a hole 22 (FIG. 2) in the base plate 20, wherein the first fastener 30 is removably engageable with the optical device. A first wall 40 is connected to the base plate 20 and extends in a substantially perpendicular direction from the base plate 20. A second wall 50 is connected to the base plate 20 and extends in a substantially perpendicular direction from the base plate 20, wherein the second wall 50 is different from the first wall 40. A stabilizing fastener 60 movably engaged within a hole 52 formed within the second wall 50, wherein a space 70 between the stabilizing fastener 60 and the first wall 40 removably receives a mounting structure (FIGS. 7-8) of the optical device, wherein the mounting structure of the optical device is contactable by the stabilizing fastener 60 and the first wall 40 when it is received within the space 70.

Figure 2:
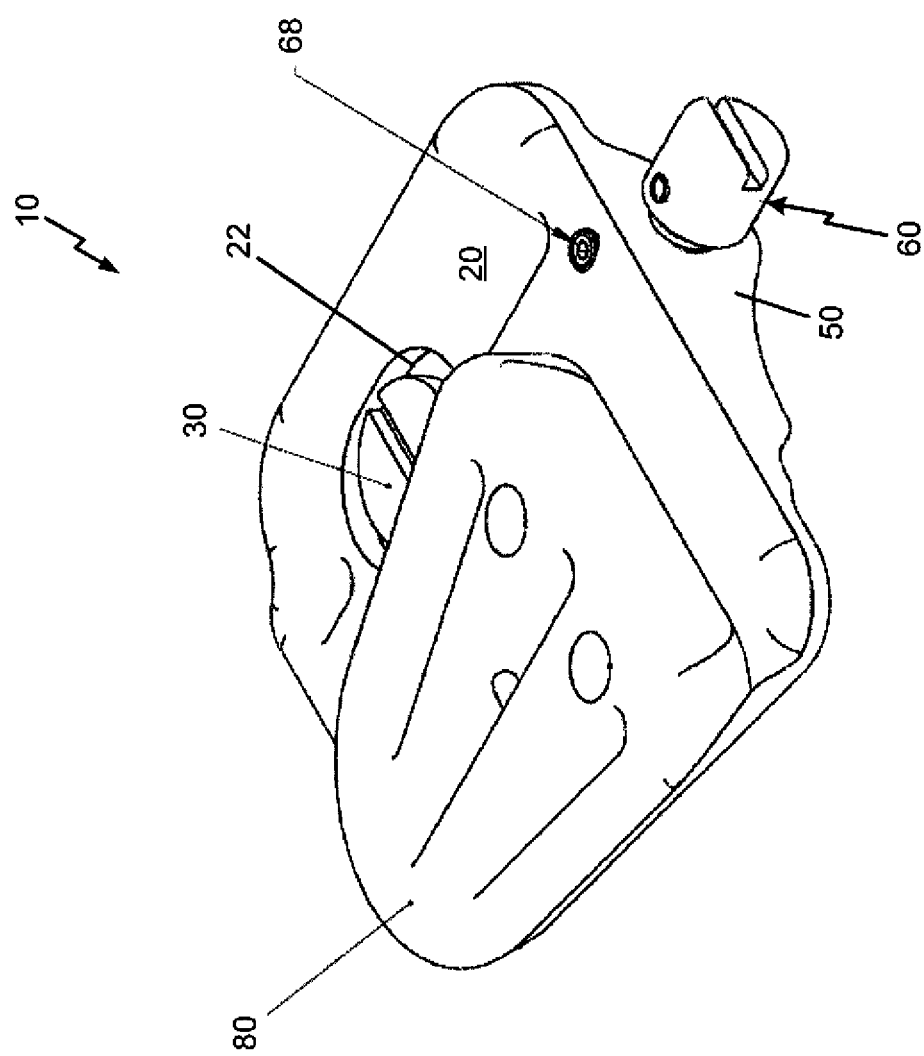
FIG. 2 is a plan view illustration of the optical device mounting apparatus of FIG. 1, in accordance with the first exemplary embodiment of the present disclosure.

FIG. 2 is a plan view illustration of the optical device mounting apparatus 10 of FIG. 1, in accordance with the first exemplary embodiment of the present disclosure. With reference to FIGS. 1-2, the base plate 20 of the apparatus 10 may be a rigid, durable structure having a substantially planar shape that generally forms the footprint of the apparatus 10. The base plate 20 can be secured to the optical device with the first fastener 30, which is commonly a threaded fastener having a flat, low-profile head, but may include other types of fasteners. The first fastener 30 is connected to the base plate 20 through a hole 22 that is formed within the base plate 20, commonly towards a central portion of the base plate 20. The hole 22 may have a counterbored or countersunk portion, or other enlarged receiving area for the head of the first fastener 30 to fit within, thereby allowing a surface of the head of the first fastener 30 to be positioned flush with or below an upper surface of the base plate 20. The exact positioning of the hole 22 may be selected to align with a receiving hole within the optical device, as is described further with respect to FIGS. 7-8.

The first and second walls 40, 50 are formed at different positions on the base plate 20, such as at opposing edges of the base plate 20. The first and second walls 40, 50 are generally formed integral with the base plate 20 and extend from the plane of the base plate 20 in a substantially perpendicular direction along the same side of the base plate 20 as the first fastener 30 extends from. The first and second walls 40, 50 may have any size and/or shape, which may be selected based on the design and contour of the optical device or optical devices with which the apparatus 10 is intended to be used with. For example, as is shown in FIG. 2, the second wall 50 may have a curved, sloping shape that allows the second wall 50 to rest closely against the contour of the optical device. Other designs of the first and second walls 40, 50 may include other shapes, such as smaller wall segments, as is discussed in greater detail relative to other figures within this disclosure.

Figure 6:
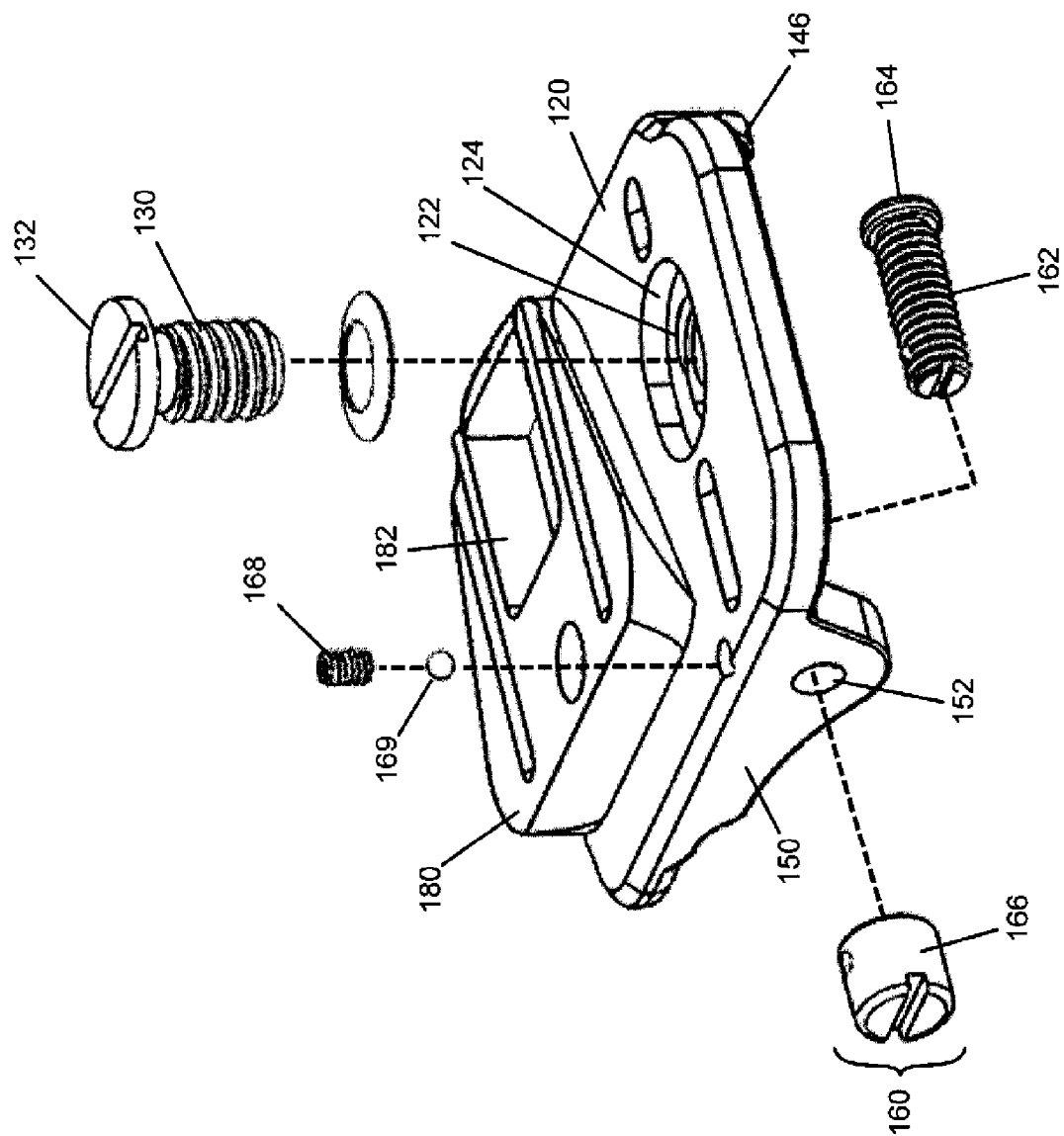
FIG. 6 is an exploded view illustration of the optical device mounting apparatus of FIGS. 4-5, in accordance with the second exemplary embodiment of the present disclosure.

The stabilizing fastener 60 is located within and through the second wall 50, wherein it may be actuated to extend into and retract from the space 70 formed by the first and second walls 40, 50. The stabilizing fastener 60 may include a threaded body 62 connected between a contact surface 64 and a head 66, where the contact surface 64 is positioned between the first and second walls 40, 50, and the head 66 is positioned external to the second wall 50. The threaded body 62 may be received within the hole 52 of the second wall 50, which may have corresponding threads to those of the threaded body 62. Thus, rotation of the head 66 rotates the threaded body 62 to move relative to the hole 52, thereby moving the contact surface 64 between the first wall 40 and the second wall 50. To ensure that the stabilizing fastener 60 does not inadvertently move, a set screw 68 may be positioned through the base plate 20 and the second wall 50 to contact a portion of the threaded body 62, thereby frictionally retaining the stabilizing fastener 60 from unintentional rotation, which may be due to vibrations or other working condition forces acting on the stabilizing fastener 60. While not shown in FIG. 2, an interface material, such as a spherical-shaped quantity of polytetrafluoroethylene (PTFE) may be positioned between the set screw 68 and the threaded body 62 (the interface material is depicted in FIG. 6). Accordingly, adjustment of the set screw 68 may control the ability of the stabilizing fastener 60 to move within the second wall 50.

A mounting shoe 80, including those known in the art or those otherwise unknown, may be used with the apparatus 10. In FIG. 2, the mounting shoe 80 is a conventional shoe 80 designed for engagement with a butterfly clip, such as would be used on a weapon mount. The mounting shoe 80 may have a substantially dovetail shape and be located on an upper surface of the base plate 20, commonly offset from the center of the base plate 20 to give clearance room to the first fastener 30. The apparatus 10 may attach the optical device with the first fastener 30 and stabilizing fastener 60/first wall 40 combination, while the mounting shoe 80 allows attachment to the mounting structure, such as a helmet mounting structure, a weapon mounting structure, and/or a pole mounting structure, as well as other mounting structures not specifically listed herein. The apparatus 10 can be used with a variety of different optical devices that are well-known in the art, such as, for example, the PVS 14 night vision monocular.

Figure 3:
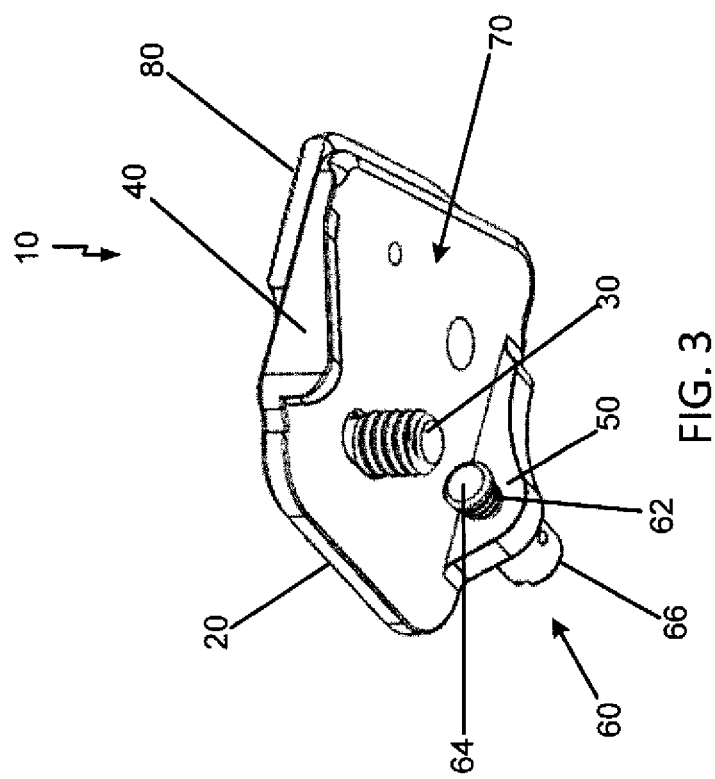
FIG. 3 is a bottom plan view illustration of an optical device mounting apparatus of FIG. 1, in accordance with the first exemplary embodiment of the present disclosure.

FIG. 3 is a bottom plan view illustration of an optical device mounting apparatus 10 of FIG. 1, in accordance with the first exemplary embodiment of the present disclosure. As can easily be seen, the space 70 that receives the mounting structure of the optical device is generally positioned between the first and second walls 40, 50. Accordingly, when the mounting structure of the optical device is positioned between the first and second walls 40, 50, the first threaded fastener 30 may be aligned with the receiving hole within the mounting structure. At the same time, the stabilizing fastener 60 may be capable of contacting the mounting structure to bias it against the first wall 40. This positioning enables the optical device to be retained stationary relative to the base plate 20.

Figure 4:
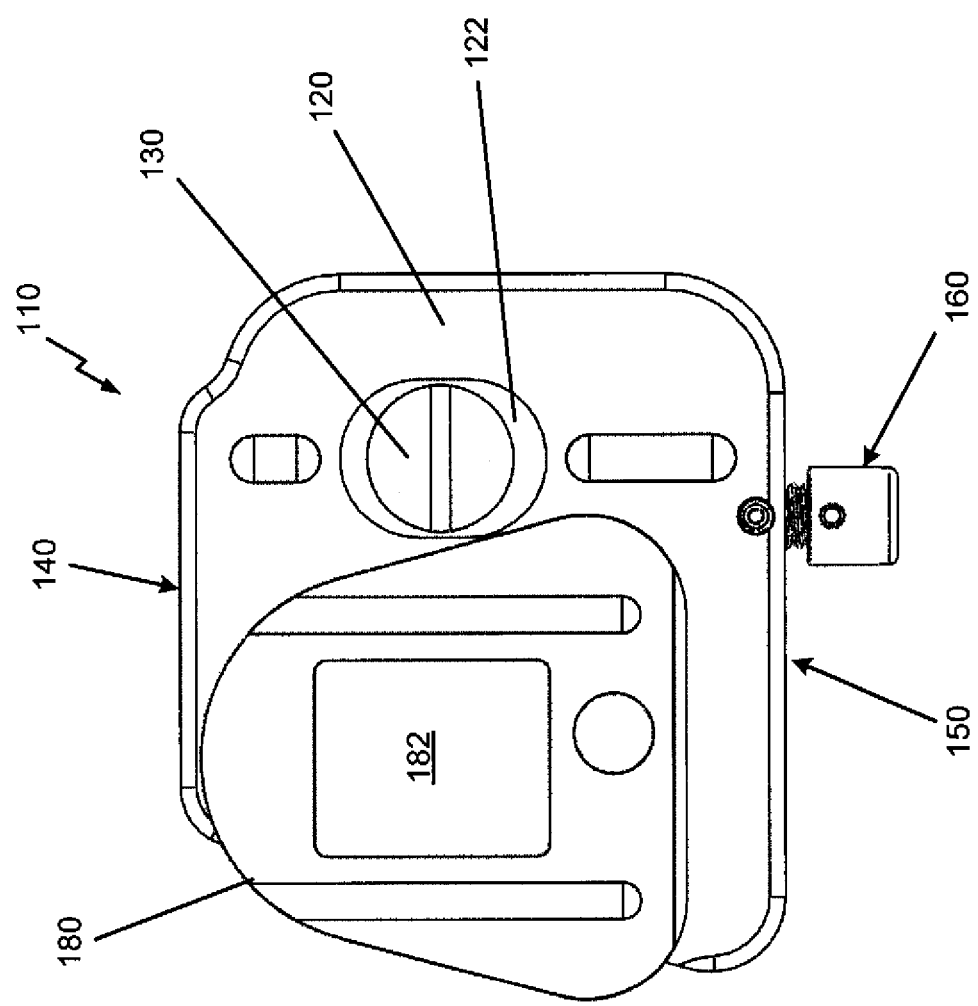
FIG. 4 is a top view illustration of an optical device mounting apparatus, in accordance with a second exemplary embodiment of the present disclosure.
Figure 5:
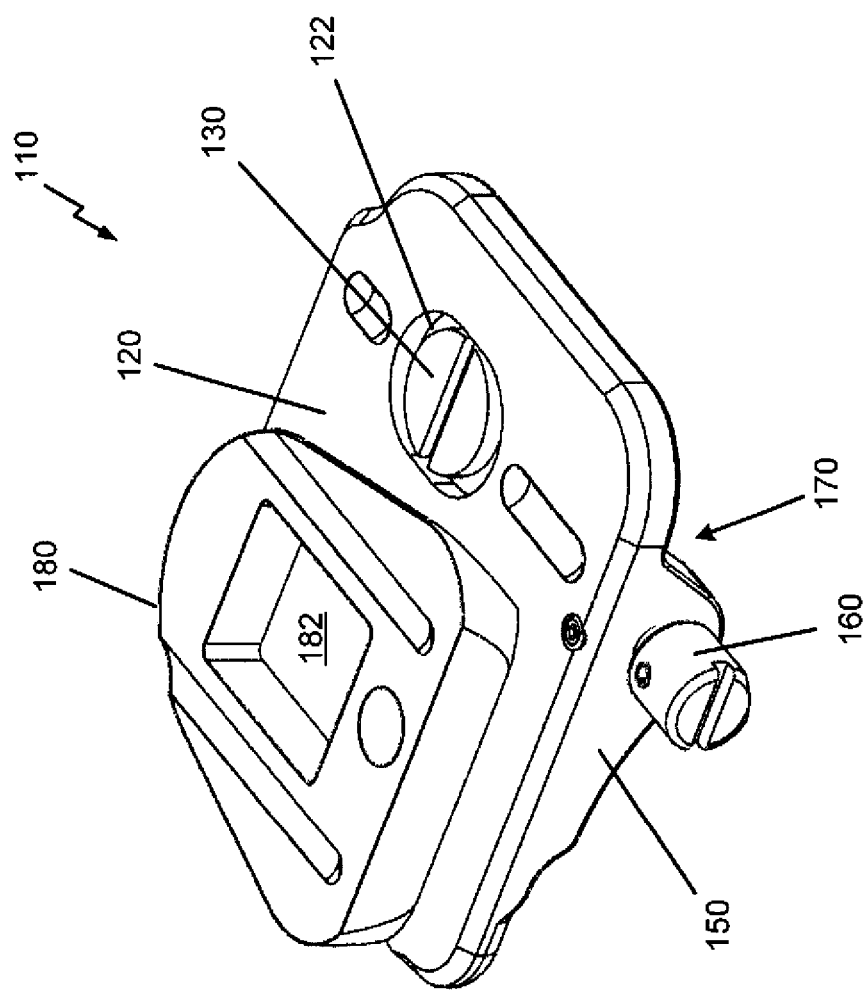
FIG. 5 is a plan view illustration of the optical device mounting apparatus of FIG. 4, in accordance with the second exemplary embodiment of the present disclosure.

FIG. 4 is a top view illustration of an optical device mounting apparatus 110, in accordance with a second exemplary embodiment of the present disclosure. FIG. 5 is a plan view illustration of an optical device mounting apparatus 110, in accordance with the second exemplary embodiment of the present disclosure. The optical device mounting apparatus 110, which may be referred to herein as 'apparatus 110' may be substantially similar to the optical device mounting apparatus 10 of the first exemplary embodiment, and may include any of the structures or functioning described with respect to any embodiment of this disclosure. Accordingly, the apparatus 110 includes a base plate 120. A first fastener 130 is positioned through a hole 122 in the base plate 120, wherein the first fastener 130 is removably engageable with the optical device. A first wall 140 is connected to the base plate 120 and extends in a substantially perpendicular direction from the base plate 120. A second wall 150 is connected to the base plate 120 and extends in a substantially perpendicular direction from the base plate 120, wherein the second wall 150 is different from the first wall 140. A stabilizing fastener 160 movably engaged within a hole 152 (FIG. 6) formed within the second wall 150, wherein a space 170 between the stabilizing fastener 160 and the first wall 140 removably receives a mounting structure (FIGS. 7-8) of the optical device, wherein the mounting structure of the optical device is contactable by the stabilizing fastener 160 and the first wall 140 when it is received within the space 170.

Additionally, the apparatus 110 of FIGS. 4-5 includes a mounting shoe 180 with pocket 182. The mounting shoe 180 has a substantially dovetail shape with the pocket commonly located within a middle portion of the mounting shoe 180. As is known in the art, the pocket 182 may be used to engage with a retractable locking member within the receiving structure of mounting structure, such as a helmet mount. The mounting shoe 180 may have any sized pocket 182, wherein the edges of the mounting shoe 180 may define the size and shape of the pocket 182. While the mounting shoe 180 of FIGS. 4-5 is depicted with a pocket 182, it may also be capable of being used with both a butterfly clip and a retractable locking mount, such that the apparatus 110 can be interchangeable between various mounting structures. As is known in the art, butterfly clips are commonly required for weapon mounts, due to the high forces produced when a weapon is discharged, whereas mounting shoes with pockets are conventionally used with helmet mounts. To account for the different types of mounting systems, the mounting shoe 180 of the apparatus 110 may be compatible with both types of mounting systems.

FIG. 6 is an exploded view illustration of the optical device mounting apparatus 110 of FIGS. 4-5, in accordance with the second exemplary embodiment of the present disclosure. As is shown, the first fastener 130 is situated to be inserted into hole 122 within base plate 120. The hole 122 has a counterbored portion 124 that allows the head 132 of the first threaded fastener 130 to be positioned below a surface of the base plate 120. The stabilizing fastener 160 is shown in distinct components, with the threaded body 162 formed integral with the contact surface 164 and the head 166 positioned to engage with the threaded body 162 after it is positioned within the hole 152 in the second wall 150. The set screw 168 and the interface material 169 are also shown removed from the hole within the base plate 120. It is noted that common mechanical devices, such as washers, different types of threaded fasteners, anti-slipping or anti-locking substances, or other components commonly used with mechanical devices may be included with the apparatus 110.

Figure 7:
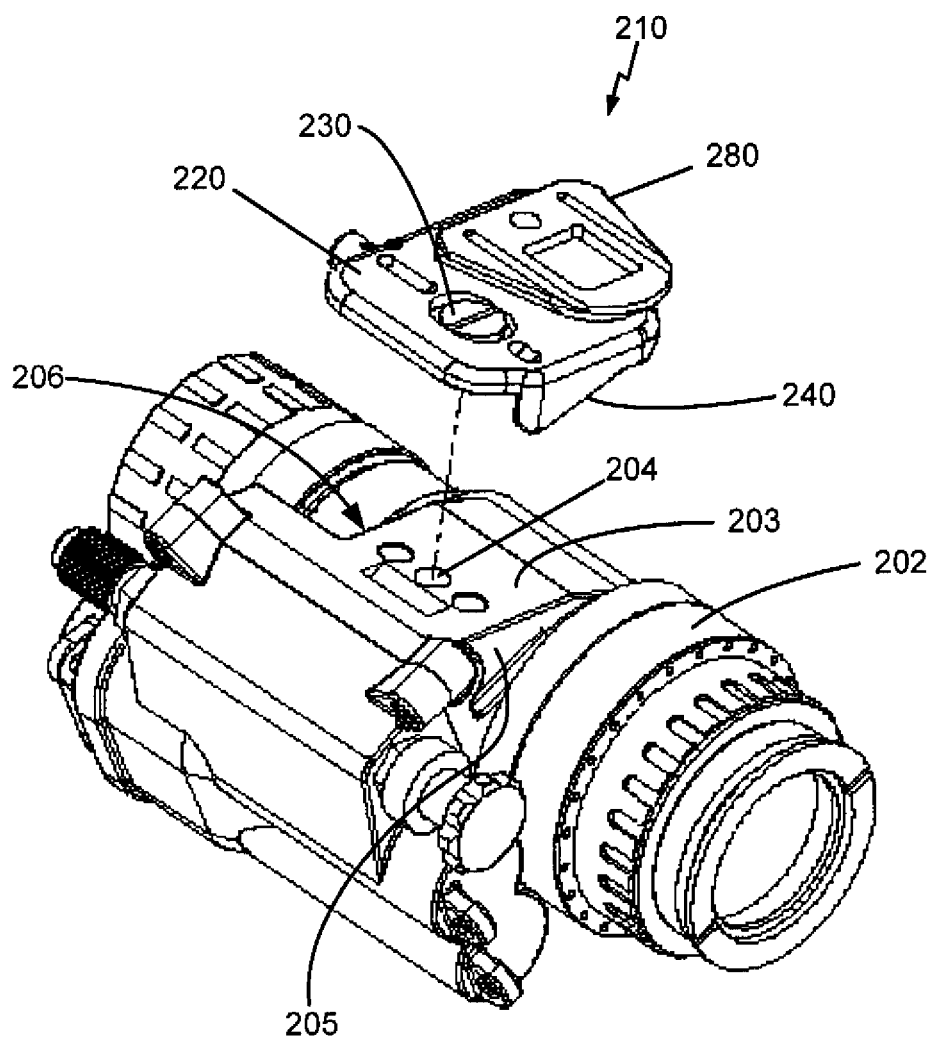
FIG. 7 is a partially exploded plan view illustration of an optical device mounting apparatus, in accordance with a third exemplary embodiment of the present disclosure.
Figure 8:
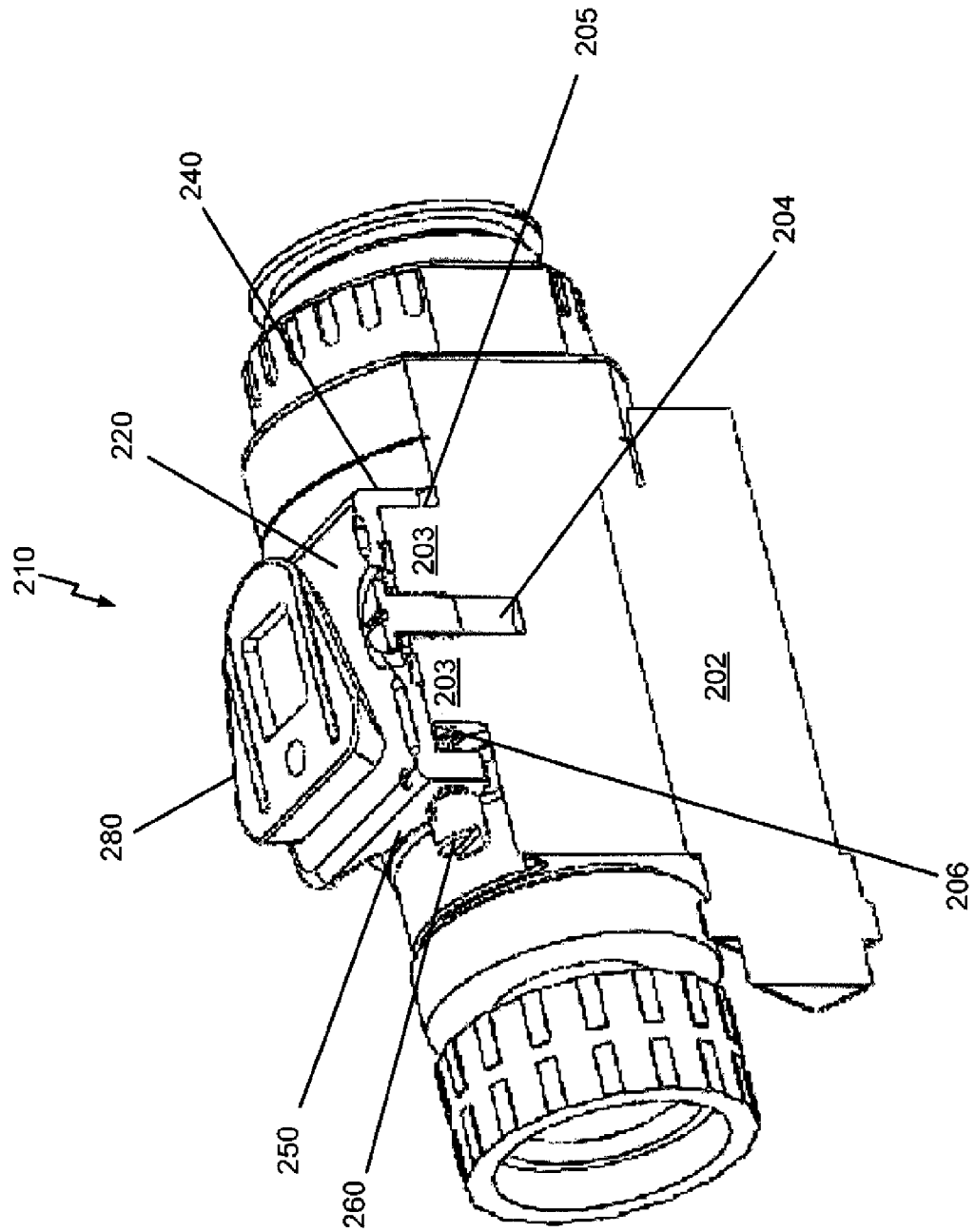
FIG. 8 is a cross-sectional view illustration of the optical device mounting apparatus of FIG. 7, in accordance with the third exemplary embodiment of the present disclosure.

FIG. 7 is a partially exploded plan view illustration of an optical device mounting apparatus 210, in accordance with a third exemplary embodiment of the present disclosure. FIG. 8 is a cross-sectional view illustration of the optical device mounting apparatus 210 of FIG. 7, in accordance with the third exemplary embodiment of the present disclosure. The optical device mounting apparatus 210, which may be referred herein as 'apparatus 210' may be substantially similar to the structures disclosed with respect to other embodiments of this disclosure. The apparatus 210 may be mounted to an optical device 202, such as a monocular optical device, as is shown. The optical device 202 may have a mounting structure 203 with a threaded hole 204 for receiving the first fastener 230. When the first fastener 230 is engaged with the threaded hole 204, the base plate 220 of the apparatus 210 may be positioned on the mounting structure 203 of the optical device 202, as is shown in FIG. 8. The first fastener 230 secures the base plate 220 to the optical device 202 in at least one direction, i.e., a direction aligned with the elongate axis of the first fastener 230.

The optical device 202 may also have a mounting structure 203 with a forward surface 205 and aft surface 206. To ensure that the base plate 220 is fully stabilized on the optical device 202, forward surface 205 and aft surface 206 of the optical device 202 are contacted by and sandwiched between the first wall 240 and the stabilizing fastener 260, respectively. The ability of the stabilizing fastener 260 to contact the aft surface 206 of the optical device 202 and allow the mounting structure 203 to be biased between the stabilizing fastener 260 and the first wall 240 ensures that the apparatus 210 remains mounted in a stable and stationary position on the optical device 202. As is best shown in FIG. 8, the forward surface 205 and aft surface 206 of the mounting area 203 are effectively clamping surfaces that may be securely contacted between the stabilizing fastener 260 and first wall 240 when the apparatus 210 is fitted on the optical device 202. The contact between the forward surface 205 with first wall 240 and aft surface 206 with the stabilizing fastener 260 prevent the optical device 202 from rotating due to forceful movements of the mounting structure, such as weapon fire.

Thus, when the apparatus 210 is attached to the optical device 202, the first fastener 230 may engage with the threaded hole 204 and act as a primary point of attachment between the optical device 202 and the apparatus 210. The combination of the first wall 240 and stabilizing fastener 260 may be used to contact a mounting structure 203 located in space 270 to prevent rotary movement of the apparatus 210, i.e., movement around the axis of the first fastener 230. The combination of the first fastener 230 and the first wall 240 with stabilizing fastener 260 may effectively limit all movement of the optical device 202 relative to the base plate 220.

Figure 9:
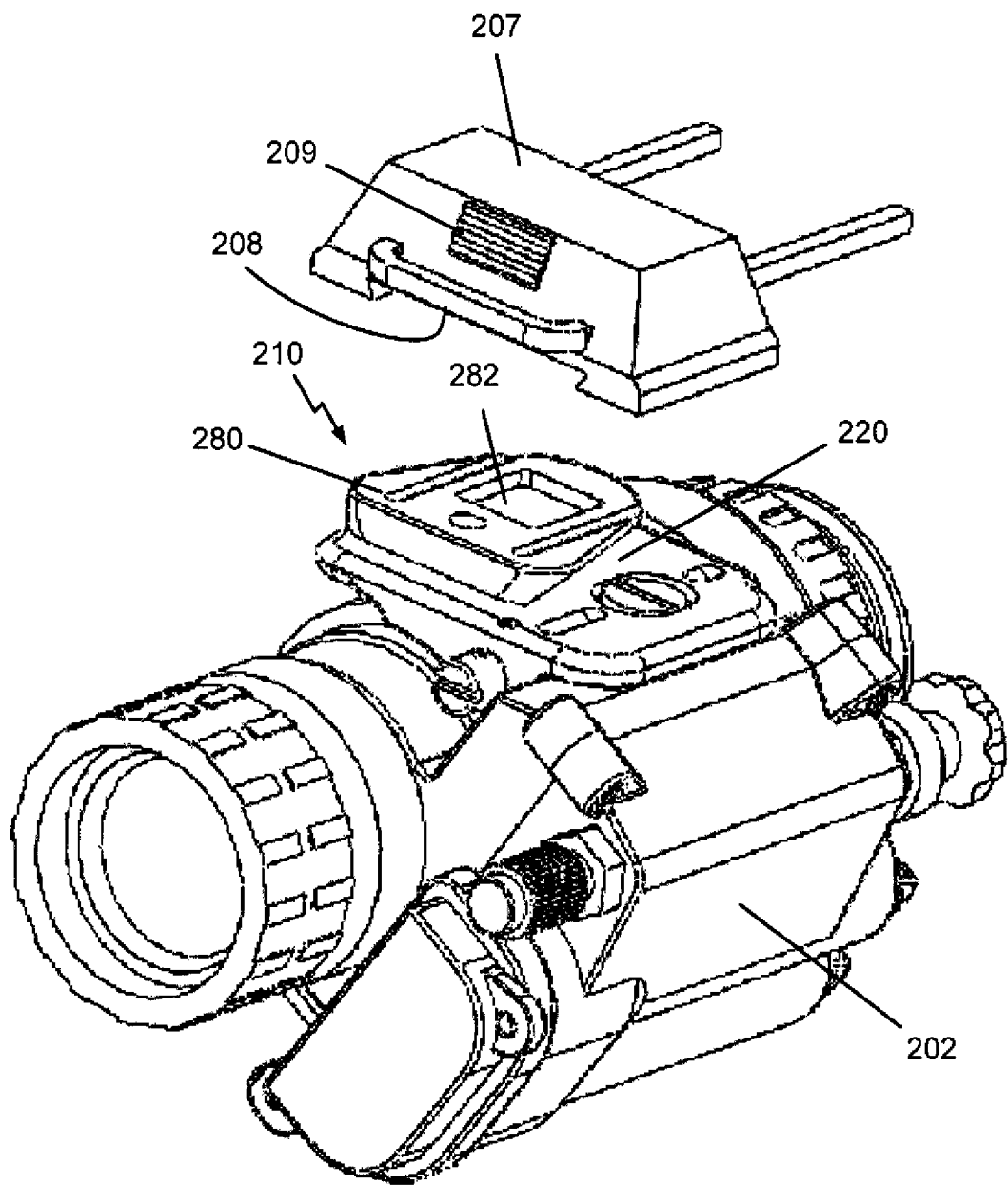
FIGS. 9-10 are plan view illustrations of an optical device mounting apparatus, in accordance with the third exemplary embodiment of the present disclosure.
Figure 10:
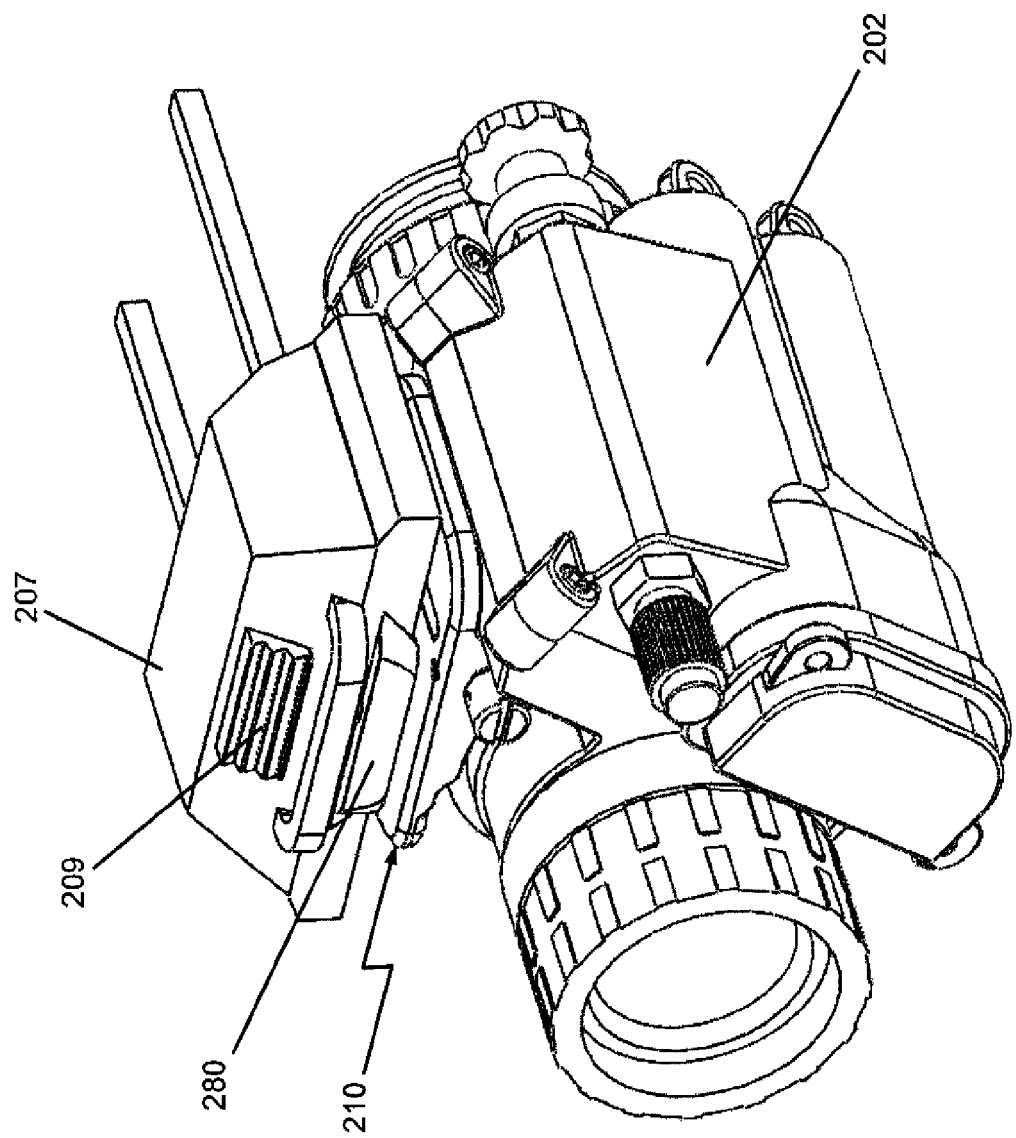

FIGS. 9-10 are plan view illustrations of an optical device mounting apparatus 210 with adjustable mounting shoe 280, in accordance with the third exemplary embodiment of the present disclosure. Specifically, FIG. 9 illustrates the apparatus 210 fully mounted on the optical device 202, where the mounting shoe 280 is situated to be engaged with a receiving structure 207. The receiving structure 207, which is known in the art, includes a receiving pocket 208, a retractable locking member (not shown), and a button 209 for moving the retractable locking member. In FIG. 10, the mounting shoe 280 is illustrated in the fully engaged position within the receiving pocket 208 of the receiving structure 207.

FIG. 11 is an exploded illustration of the optical device mounting apparatus 310 in use with a helmet mounting system 301, in accordance with a fourth exemplary embodiment of the present disclosure. The optical device mounting apparatus 310, which may be referred to herein as 'apparatus 310' may be substantially similar to the optical device mounting apparatus 10 of the first exemplary embodiment, and may include any of the structures or functioning described with respect to any embodiment of this disclosure. The apparatus 310 may be used to retain the optical device 302 to a helmet 303 that is worn by a human being, such that the optical device 302 can be positioned within a line of sight of the human being. The apparatus 310 may be used in combination with a variety of other mounting hardware. For example, the mounting hardware may include a shroud 306 affixed to the helmet 303, wherein a helmet mount 305 is connectable to the shroud 106. A helmet mount connector 307 may engage with a receiver 308 of the helmet mount 305 and receive the shoe 380 of the apparatus 310, to lock the apparatus 310 to the helmet mount 305.

Figure 13:
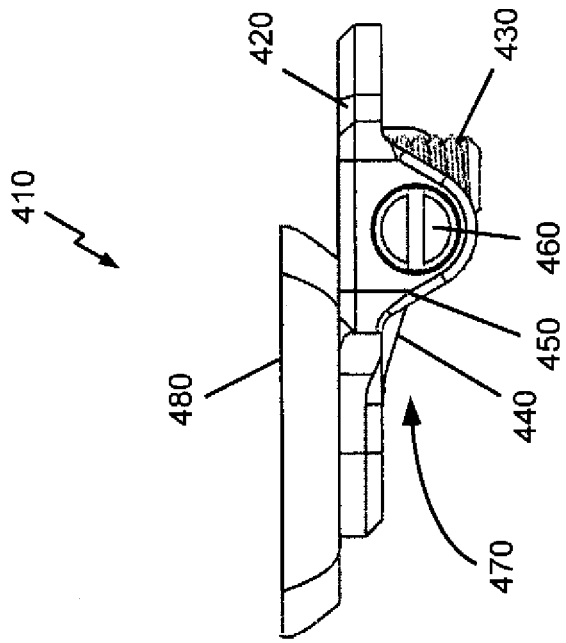
FIG. 13 is a side view illustration of the optical device mounting apparatus of FIG. 12, in accordance with the fifth exemplary embodiment of the present disclosure.
Figure 12:
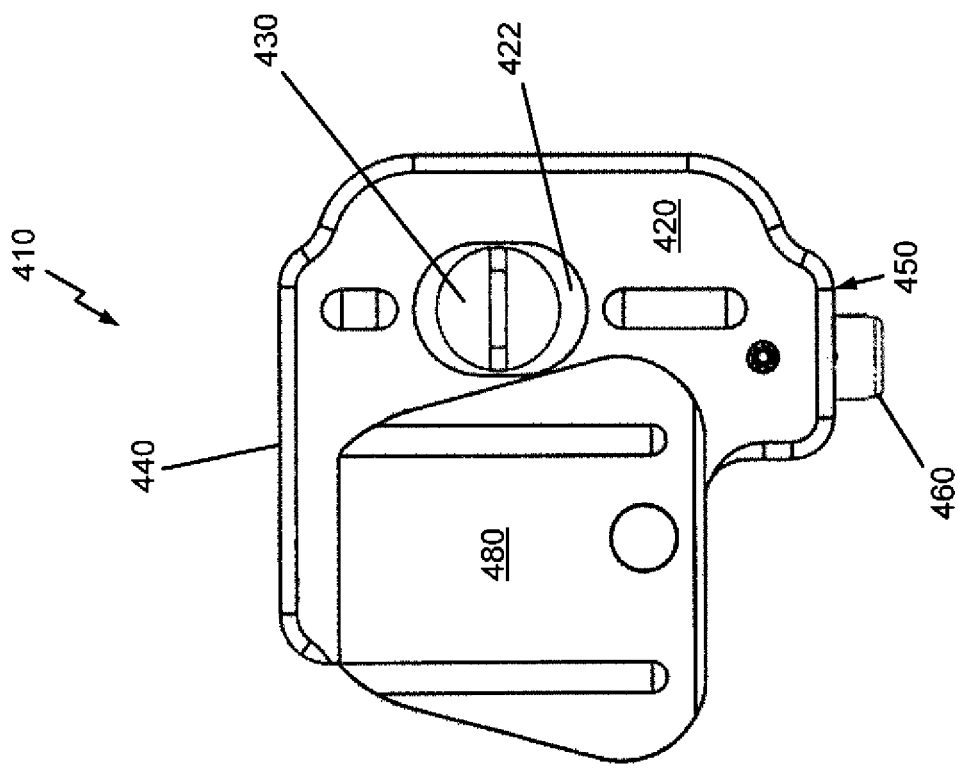
FIG. 12 is a top view illustration of an optical device mounting apparatus, in accordance with a fifth exemplary embodiment of the present disclosure.

FIG. 12 is a top view illustration of an optical device mounting apparatus 410, in accordance with a fifth exemplary embodiment of the present disclosure. FIG. 13 is a side view illustration of the optical device mounting apparatus 410 of FIG. 12, in accordance with the fifth exemplary embodiment of the present disclosure. The optical device mounting apparatus 410, which may be referred to herein as 'apparatus 410' may be substantially similar to the optical device mounting apparatus 10 of the first exemplary embodiment, and may include any of the structures or functioning described with respect to any embodiment of this disclosure.

The apparatus 410 includes a base plate 420. A first fastener 430 is positioned through a hole 422 in the base plate 420, wherein the first fastener 430 is removably engageable with the optical device. A first wall 440 is connected to the base plate 420 and extends in a substantially perpendicular direction from the base plate 420. A second wall 450 is connected to the base plate 420 and extends in a substantially perpendicular direction from the base plate 420, wherein the second wall 450 is different from the first wall 440. A stabilizing fastener 460 movably engaged within a hole 452 formed within the second wall 450, wherein a space 470 between the stabilizing fastener 460 and the first wall 440 removably receives a mounting structure (FIGS. 7-8) of the optical device, wherein the mounting structure of the optical device is contactable by the stabilizing fastener 460 and the first wall 440 when it is received within the space 470.

As can be seen in FIGS. 12-13, the apparatus 410 may include various designs therein to increase efficient manufacturing, aesthetic appeal, and/or usability of the apparatus 410. For example, the first and second walls 440, 450 may include small wall portions to minimize manufacturing costs of the apparatus 410. The second wall 450, as is shown in FIG. 13, may be sized large enough to receive the stabilizing fastener 460, but otherwise be free from excess material. Likewise, the base plate 420 may be shortened (relative to the apparatus 10 of FIGS. 1-2), such that the mounting shoe 480 extends over the edge of the base plate 420. The mounting shoe 480 may still be sufficiently connected to the base plate 420 to ensure proper usage of the apparatus 410, but the decrease of base plate 420 material under the mounting shoe 480 may result in less raw material needed to manufacture the apparatus 410. Other design features may also be included, such as rounding or chamfering of edges, cut-outs of material, grooves, texturing, or the like, to improve the apparatus 410, all of which are considered within the scope of the present disclosure.

Figure 14:
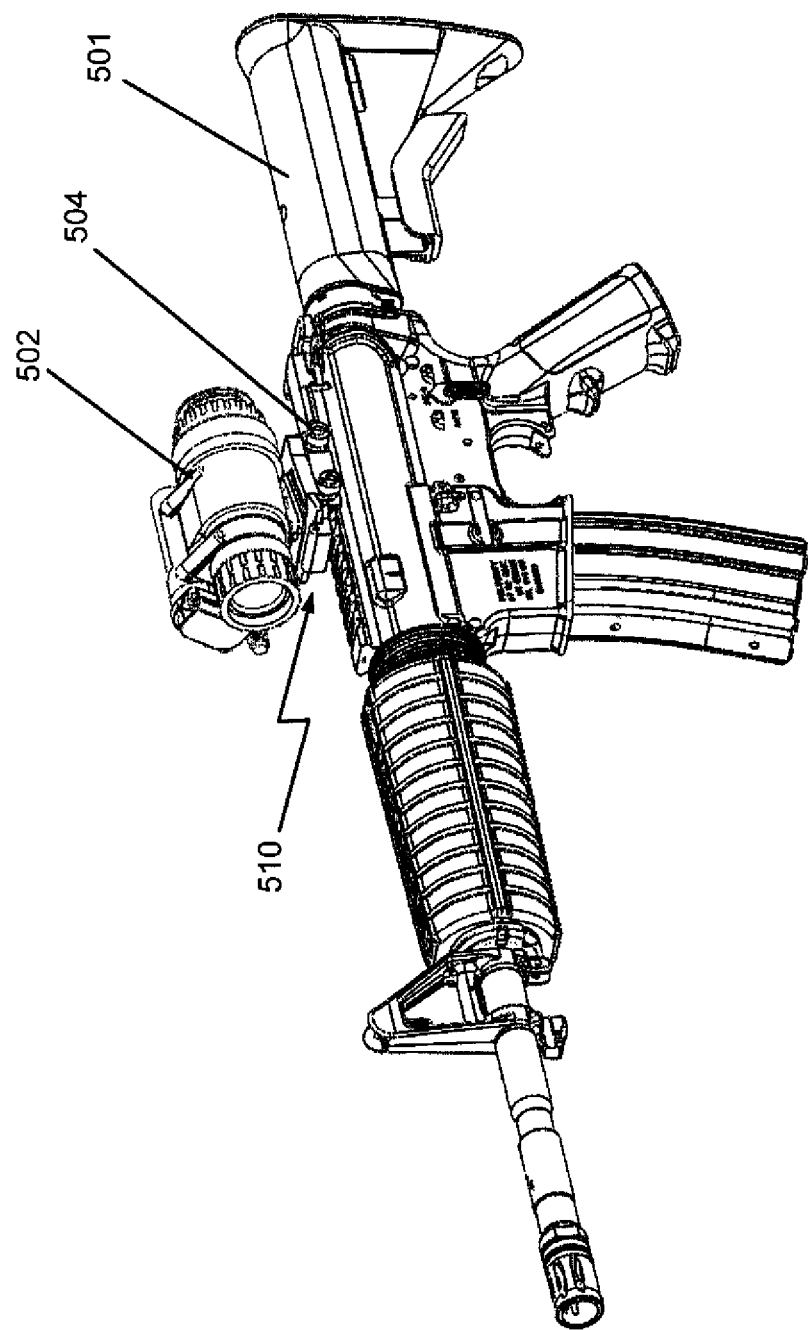
FIG. 14 is a plan view illustration of an optical device mounting apparatus in use on a weapon mounting system, in accordance with a sixth exemplary embodiment of the present disclosure.
Figure 15:
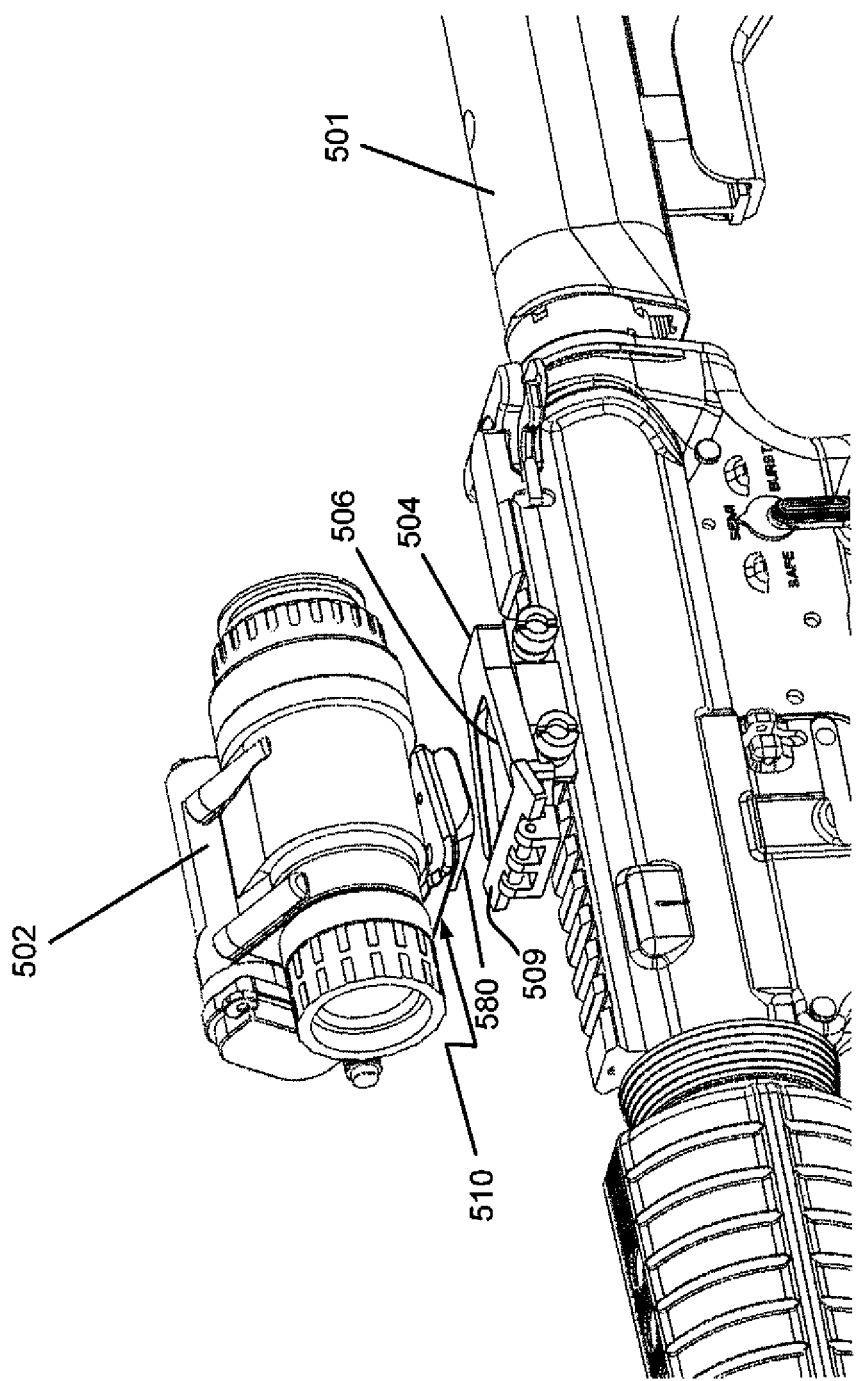
FIG. 15 is an enlarged, partially exploded plan view illustration of an optical device mounting apparatus in use on a weapon mounting system of FIG. 14, in accordance with the sixth exemplary embodiment of the present disclosure.
Figure 16:
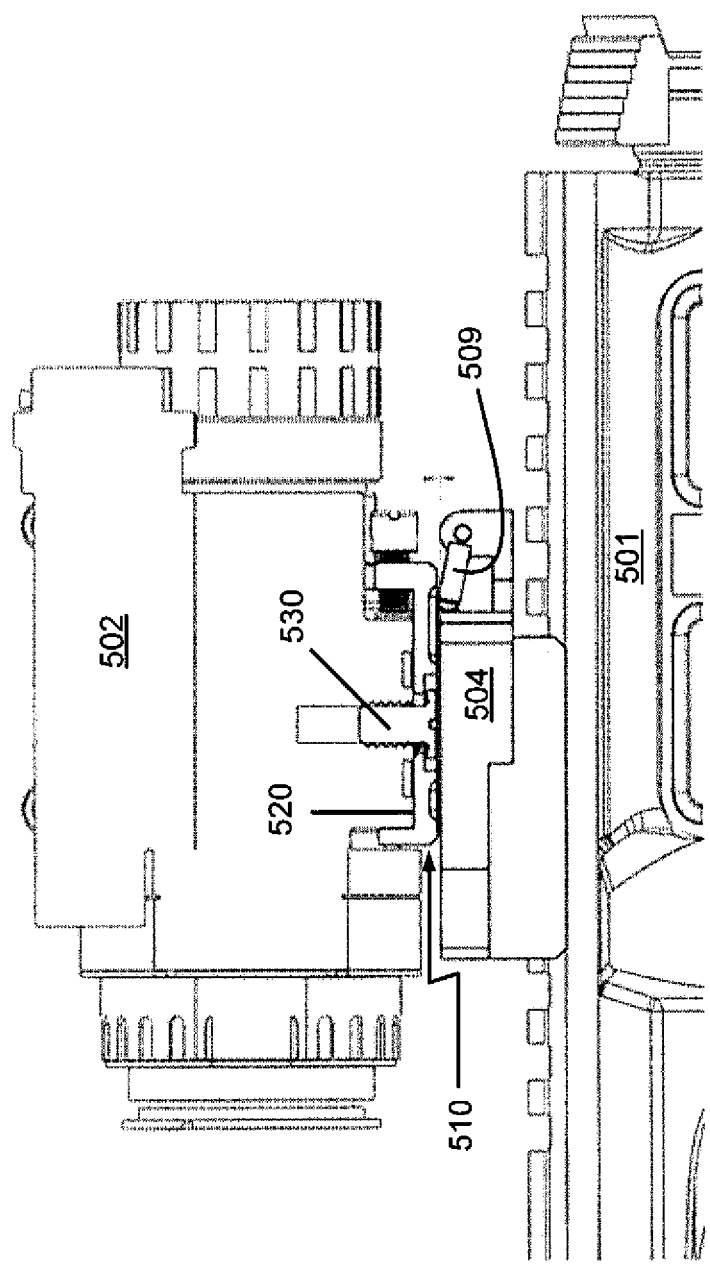
FIG. 16 is a side view illustration of an optical device mounting apparatus in use on a weapon mounting system of FIGS. 14-15, in accordance with the sixth exemplary embodiment of the present disclosure.

FIG. 14 is a plan view illustration of an optical device mounting apparatus 510 in use on a weapon mounting system 504, in accordance with a sixth exemplary embodiment of the present disclosure. FIG. 15 is an enlarged, partially exploded plan view illustration of an optical device mounting apparatus 510 in use on a weapon mounting system 504 of FIG. 14, in accordance with the sixth exemplary embodiment of the present disclosure. FIG. 16 is a side view illustration of an optical device mounting apparatus 510 in use on a weapon mounting system 502 of FIGS. 14-15, in accordance with the sixth exemplary embodiment of the present disclosure. The optical device mounting apparatus 510, which may be referred herein as 'apparatus 510' may be substantially similar to the structures disclosed with respect to other embodiments of this disclosure, and may include any of the features, designs, or functioning described relative to any embodiment of this disclosure.

The apparatus 510 may be affixed to a weapon 501 to allow an optical device 502 to be used by a user of the weapon 501. The weapon 501 has the weapon mounting system 504 affixed thereto, wherein the weapon mounting system 504 includes a receiving structure 506. The apparatus 510, having the mounting shoe 580, is connectable within the receiving structure 506 of the weapon mounting system 504. As is shown best in FIG. 15, the mounting shoe 580 and the receiving structure 506 of the weapon mounting system 504 are engagable, with a butterfly clip 509 locking the mounting shoe 580 within the receiving structure 506 (shown in FIG. 16). The use of the butterfly clip 509, which is known in the art, allows the apparatus 510 to retain the optical device 502 to the weapon 501 throughout use of the weapon 501. Accordingly, the optical device 502 remains in a steady and secure position on the weapon 501 even when the optical device 502 receives the forces distributed to the apparatus 510 while the weapon 501 is being discharged.

FIG. 16 depicts the necessary clearance between the apparatus 510 and the weapon mounting system 504. As can be seen, due to the tight space between the optical device 502 and the weapon 501, it is beneficial for the apparatus 510 to have a low profile to ensure that the butterfly clip 509 or other structures do not undesirably contact the apparatus 510. Accordingly, the various components of the apparatus 510, such as the first fastener 530, may have a low profile so they do not interfere with the limited clearance with the weapon mounting system 504 on the weapon 501. For example, as is shown in FIG. 16, the first fastener 530 may be selected to have a low-profile head that is fully positioned within a cavity or countersink in the base plate 520, such that the head of the first fastener 530 is not positioned beyond the planar surface of the base plate 520. As an example, the at least 0.015 inches of clearance may be provided between the head of the first fastener 530 and the top of the weapon mounting system 504. In contrast, conventional fasteners used to secure an optical device 502 to a weapon 501 are large and bulky, such as hand-threadable fasteners, which could not be used within the limited clearance space required to ensure that apparatus 510 functions with the butterfly clip 509 and weapon mounting system 504 of the weapon 501.

Figure 17:
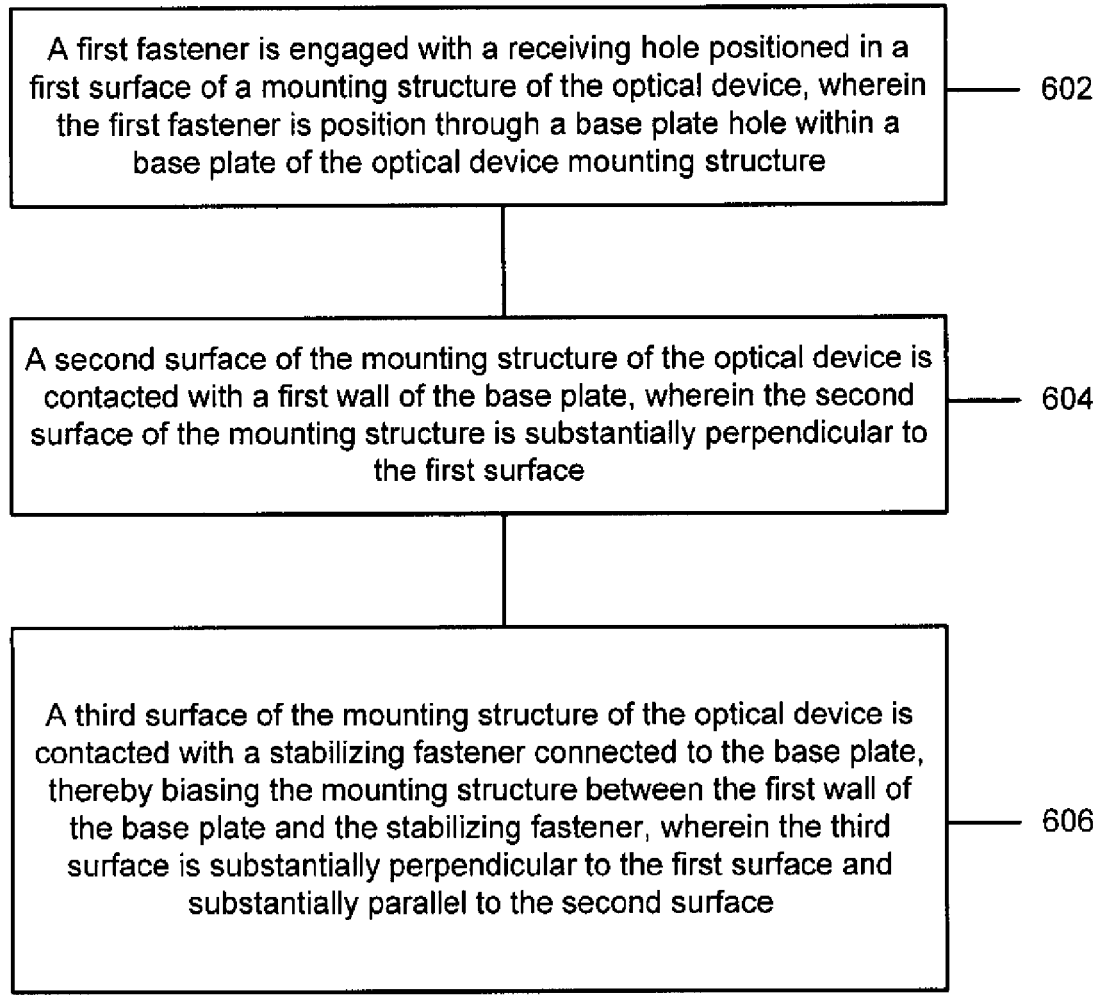
FIG. 17 is a flowchart illustrating a method of mounting an optical device to an optical device mounting structure, in accordance with a seventh exemplary embodiment of the disclosure.

FIG. 17 is a flowchart 600 illustrating a method of mounting an optical device to an optical device mounting structure, in accordance with a seventh exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 602, a first fastener is engaged with a receiving hole positioned in a first surface of a mounting structure of the optical device, wherein the first fastener is positioned through a base plate hole within a base plate of the optical device mounting structure. A second surface of the mounting structure of the optical device is contacted with a first wall of the base plate, wherein the second surface of the mounting structure is substantially perpendicular to the first surface (block 604). A third surface of the mounting structure of the optical device is contacted with a stabilizing fastener connected to the base plate, thereby biasing the mounting structure between the first wall of the base plate and the stabilizing fastener, wherein the third surface is substantially perpendicular to the first surface and substantially parallel to the second surface (block 606).

The method may include any number of additional steps, processes, or variations thereof, including any of the steps, functions, or structures disclosed in any exemplary embodiment of this disclosure. For example, the first fastener may be engaged with the receiving hole of the mounting structure and the mounting structure may be biased between the first wall of the base plate and the stabilizing fastener to retain the mounting structure of the optical device stationary relative to the base plate. Movement of the stabilizing fastener may be regulated with a set screw and an interface material, wherein the set screw biases the interface material against the stabilizing fastener. The optical device mounting structure may be connected to at least one of a helmet mount, a weapon mount, and a pole mount with a mounting shoe, wherein the mounting shoe is affixed to the base plate of the optical device mounting structure. At least 0.015 inches of clearance may be provided between a head of the first fastener and the at least one helmet mount, weapon mount, and pole mount by positioned the head of the first fastener within a counterbore within the base plate.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An optical device mounting apparatus comprising:
   a base plate;
   a first fastener positioned through a hole in the base plate, wherein the first fastener is removably engaged with an optical device;
   a first wall connected to the base plate and extending in a substantially perpendicular direction from the base plate;
   a second wall connected to the base plate and extending in a substantially perpendicular direction from the base plate, wherein the second wall is different from the first wall; and
   a stabilizing fastener movably engaged within a hole formed within the second wall, wherein a mounting structure of the optical device is removably positioned in a space between the stabilizing fastener and the first wall, wherein the mounting structure of the optical device is contacted by the stabilizing fastener and the first wall when it is positioned within the space.

2. The optical device mounting apparatus of claim 1, further comprising a mounting shoe affixed to the base plate.

3. The optical device mounting apparatus of claim 1, wherein the mounting structure of the optical device received within the space is biased by the stabilizing fastener against the first wall, wherein the mounting structure is positioned in contact with the first wall.

4. The optical device mounting apparatus of claim 1, wherein the optical device is restrained stationary relative to the base plate.

5. The optical device mounting apparatus of claim 1, wherein the hole in the base plate further comprises a counterbore within the base plate, wherein a head of the first fastener is positioned below an upper surface of the base plate.

6. The optical device mounting apparatus of claim 1, wherein a surface of a head of the first fastener is positioned flush with an upper surface of the base plate.

7. The optical device mounting apparatus of claim 1, wherein the first wall is positioned at a first edge of the base plate and the second wall is positioned at a second edge of the base plate, wherein the first edge opposes the second edge.

8. The optical device mounting apparatus of claim 1, wherein the stabilizing fastener further comprises a threaded body and a contact surface, wherein the threaded body is movably engaged with the hole formed in the second wall, and wherein the contact surface is positioned between the first and second walls.

9. The optical device mounting apparatus of claim 8, further comprising a fastener head connected to the threaded body, wherein the second wall is positioned between the fastener head and the contact surface.

10. The optical device mounting apparatus of claim 1, further comprising a set screw positioned at least partially through at least one of the base plate and the second wall, wherein the set screw contacts a portion of the stabilizing fastener within the hole formed in the second wall.

11. The optical device mounting apparatus of claim 10, further comprising an interface material positioned between the set screw and the portion of the stabilizing fastener within the hole formed in the second wall.

12. The optical device mounting apparatus of claim 11, wherein the interface material further comprises a spherical-shaped quantity of polytetrafluoroethylene.

13. An optical device mount comprising:
a base plate;
a first threaded fastener positioned through a counterbored hole in a middle portion of the base plate, wherein a head of the first threaded fastener is positioned below a surface of the base plate;
at least a first wall and a second wall connected to the base plate and extending in a substantially perpendicular direction from the base plate, wherein the first wall is in an opposing position to the second wall; and
a threaded stabilizing fastener movably positioned at least partially within a hole formed within the second wall, the threaded stabilizing fastener having a device contact surface positioned between the first and second walls, wherein an optical device is stationarily positioned between the first and second walls with the first threaded fastener threadedly engaged with the optical device and the threaded stabilizing fastener biasing the optical device against the first wall.

14. The optical device mounting apparatus of claim 13, wherein the first threaded fastener is positioned between the threaded stabilizing fastener and the first wall.

15. A method of mounting an optical device to an optical device mounting structure, the method comprising:
engaging a first fastener with a receiving hole positioned in a first surface of a mounting structure of the optical device, wherein the first fastener is positioned through a base plate hole within a base plate of the optical device mounting structure;
contacting a second surface of the mounting structure of the optical device with a first wall of the base plate, wherein the second surface of the mounting structure is substantially perpendicular to the first surface; and
contacting a third surface of the mounting structure or the optical device with a stabilizing fastener connected to the base plate, thereby biasing the mounting structure between the first wall of the base plate and the stabilizing fastener, wherein the third surface is substantially perpendicular to the first surface and substantially parallel to the second surface.

16. The method of claim 15, wherein engaging the first fastener with the receiving hole of the mounting structure and the biasing the mounting structure between the first wall of the base plate and the stabilizing fastener retains the mounting structure of the optical device stationary relative to the base plate.

17. The method of claim 15, further comprising the step of regulating movement of the stabilizing fastener with a set screw and an interface material, wherein the set screw biases the interface material against the stabilizing fastener.

18. The method of claim 15, further comprising the step of connecting the optical device mounting structure to at least one of a helmet mount, a weapon mount, and a pole mount with a mounting shoe, wherein the mounting shoe is affixed to the base plate of the optical device mounting structure.

19. The method of claim 18, further comprising the step of providing at least 0.015 inches of clearance between a head of the first fastener and the at least one helmet mount, weapon mount, and pole mount by positioned the head of the first fastener within a counterbore within the base plate.

20. The method of claim 15, wherein the stabilizing fastener further comprises a threaded body movably engaged with threaded hole in a second wall of the base plate, wherein the second wall is positioned substantially perpendicular to the base plate, and wherein the step of contacting the third surface of the mounting structure of the optical device with the stabilizing fastener further comprises rotating the threaded body within the threaded hole, thereby moving the threaded body into a contacting position with the third surface of the mounting structure.

* * * * *